July 6, 1965 G. F. GRONDIN 3,193,801

LARGE GAP DATA COMMUNICATION SYSTEM

Filed Sept. 28, 1959 4 Sheets-Sheet 1

INVENTOR.
GEORGE F. GRONDIN
BY Moody and Goldman
ATTORNEYS

LARGE GAP DATA COMMUNICATION SYSTEM

Filed Sept. 28, 1959 4 Sheets-Sheet 2

INVENTOR.
GEORGE F. GRONDIN
BY Moody and Holdman
ATTORNEYS

INVENTOR.
GEORGE F. GRONDIN
BY Moody and Goldman
ATTORNEYS

INVENTOR.
GEORGE F. GRONDIN
BY Moody and Goldman
ATTORNEYS 3,193,801

LARGE GAP DATA COMMUNICATION SYSTEM

George F. Grondin, Van Nuys, Calif., assignor to Collins Radio Company, Cedar Rapids, Iowa, a corporation of Iowa Filed Sept. 28, 1959, Ser. No. 842,795
7 Claims. (Cl. 340—172.5)

This invention relates to adapting nonsynchronous binary tape readers and writers to a synchronous communication system. The invention is particularly related to the transmission of magnetic or perforated tape binary data arranged in a format having blocks of data separated by relatively large gaps. An example of such format is a block cycle period nominally being 50% occupied by a data block and 50% by a following spacer gap.

The term "reader" is used herein to include devices that sense recorded binary-magnetization changes to produce corresponding impulses. Likewise, the term "writer" includes devices capable of recording such impulses on a magnetic material.

The invention operates a reader in its normal nonsynchronous mode. Presently available readers vary in their data rate between maximum and minimum values, which depend upon such variable factors as bit packing of recorded magnetic tape, input voltage changes, instabilities of component parts, etc. As a result, their reading rates vary by about 10% about stated nominal rates.

It is, therefore, a principal object of this invention to provide means for converting data nonsynchronously read from magnetic tape for transmission by a bit-synchronous communication system.

It is another object of this invention to provide a communication system for binary magnetic tape capable of having automatic error correction included with it.

It is still another object of this invention to provide a magnetic tape binary communication system that time-stretches the data blocks to largely fill the large spacer gaps during synchronous transmission.

It is another object of this invention to restore the large gaps at the receiving terminal where the data is written with a large gap format of the type on the original tape at the transmitter.

The present application is related to another application titled, "Small Gap Data Communication System" by the same inventor, filed September 28,1959, and having Serial No. 842,709 now Pat. No. 3,131,377. The present case differs in its tape format, which allows for unique changes in the communication system in the present instance.

It is a further object of this invention to provide a large gap data tape transmitting and receiving system which may have either its reading or writing terminal interchanged with a small gap format reading or writing terminal in the above cited application, Serial No. 842,709, now Pat. No. 3,131,377. Thus, by using a transmission according to the present application and reception according to the related application, tape with a large gap format may be communicated and written with a small gap. And vice versa, by using a transmission system according to the related application and a receiving system according to the present application, a small gap tape may be communicated and written with a large gap format.

A bit-synchronous communication system that may be used with the invention is described and claimed in patent application Serial No. 502,045, now Patent No. 2,905,812, filed April 16, 1955 by Melvin L. Doelz, et al. titled, "High Information Capacity Phase-Pulse Multiplex System," assigned to the same assignee as the present invention.

Primary advantages of a bit-synchronous communication system are greater economy of bandwidth, and a better signal-to-noise ratio than are obtainable with a bit-nonsynchronous communication system under the same transmission conditions. For example, a voice-quality telephone line can have its data information capacity approximately doubled by utilizing a synchronous communication system. However, most important to many types of data communications is the improvement of received signal-to-noise ratio by a synchronous system over a nonsynchronous system. For example, a single error may invalidate an entire block of binary data, which may contain several hundred bits of information. Hence, a system which minimizes error is mandatory in many situations.

For definition purposes, data is transmitted in the invention as a sequence of data "blocks." Each block consists of a plurality of consecutive "words," in which each word consists of parallel bits of information. The number of parallel bits equals the number of channels on a tape. Each block is followed by a spacer gap, during which no data is transmitted. However, a spacer gap may contain directions between the reader and the writer, which do not result in any written data. In this invention, the spacer gap found on the tape is relatively large compared to the time of the block that it follows, such as where they have a 50%-50% relationship. This is a format utilized by many types of digital computers having facilities for magnetic tape readin and/or readout.

For example, a block may have a 120 bit length and include eight parallel channels. Generally, six of the channels are independent data channels, a seventh channel is for timing control, and an eighth channel is a lateral parity channel, in which a "1" *or a* "0" is provided so that the simultaneously occuring bits in each eight bit "word" always adds up to an odd value (or an even value, if desired).

Although the invention operates with bit synchronism during communication, it does not require block synchronism. That is, the invention can tolerate significant variation in its transmitted block rates.

The large spacer gaps found in the data format of this invention are not transmitted, but the data blocks are stretched in time length to fill most of the gap during transmission. Only a small transmission gap remains to separate transmitted blocks of data. By having only a small percentage of transmission time used for spacer gaps, the efficiency of data transmission is greater than what would be obtainable in a transmission with the large gaps. A buffer storage device is used at the transmitter to stretch the short nonsynchronous blocks being read into the long word-synchronous blocks for transmission. The loading into the buffer from the reader is much faster than its unloading for transmission. Accordingly, no initial delay is provided between block loading and unloading. However, when the reader is operating faster than a medium rate, it is stopped for a short period of time during each spacer gap. Stop periods are not required when the block time exceeds a given medium time length.

The synchronously transmitted blocks all have the same length. But the transmitted gaps vary with the nonsynchronous read rate.

A synchronous receiver receives the transmitted data via a wire or radio medium. The received data is loaded into another storage device at the synchronous receive rate. But it is unloaded into a data writer at twice the received rate, after at least one-half the block has been received. Thus, the data is written in one-half the time needed to receive it, and the remaining time occupies spacer gaps. Hence, the data is written with a format that is very nearly the 50%–50% format provided from the nonsynchronous reader.

The automatic error correction features of related application Serial No. 842,709, now Patent No. 3,131,377, are included herein by reference, since they are directly applicable.

Automatic error correction may be provided by signalling the reader over the same communication medium during the short spacer gap following transmission of an erroneous block. The error signal causes the reader and writer to automatically back-up for a retransmission of the erroneous block. The existence of an error is obtained by a parity system providing error detection. In low error-rate systems, this arrangement is much more efficient than using error-correcting parity, which would involve a much greater amount of redundancy.

Further objects, features and advantages of this invention will be apparent to one skilled in the art upon further study of the specification and the accompanying drawings, in which:

FIGURES 1(A)–(J) illustrate timing diagrams used in explaining fundamentals of the invention;

The drawings will now be considered in regard to a preferred embodiment of the invention.

READING TERMINAL

Figure 2:
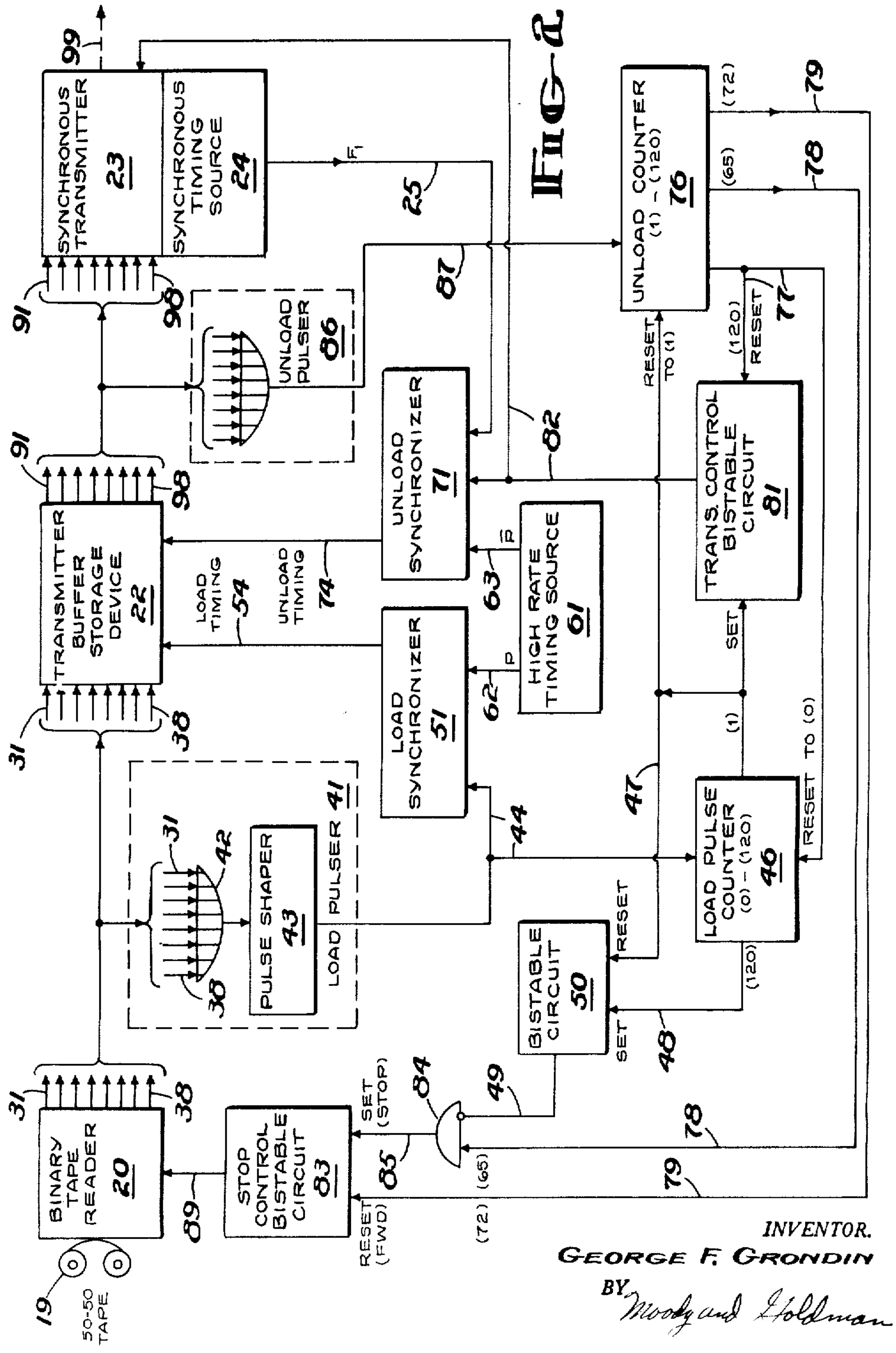
FIGURE 2 shows a reading terminal of an embodiment of the invention.

FIGURE 2 illustrates a general embodiment of a reading terminal of the invention which is simplified by not providing features for automatic error correction. The error correcting circuitry shown in related patent application Serial No. 842,709, now Patent No. 3,131,377, can be directly added to provide automatic error correction.

*Tape reader 20*

In FIGURE 2, a binary recorded magnetic tape 19 provides an input to the embodiment. The recorded binary data is in block cycles, with 50% of each cycle being a data block, and 50% being a spacer gap following the data. The embodiment also presumes approximately a 10% tolerance in the reading time for block-cycle periods provided from a reader 20, which operates nonsynchronously to read tape 19, without servo control. Digital tape reader 20 may be a standard tape handler such as Ampex FR–200 or Potter 906 set for reading operation.

The tape has eight parallel channels in which seven are independent and the eighth is a redundant channel having lateral parity information for the other seven channels. Each parity bit adds with the simultaneous bits on the other seven channels to total a binary "1" as a lowest order digit. Each set of eight lateral bits having a parity total is a "word." Each data block has a length of 120 words on the tape.

*Block cycle alteration for transmission*

The nonsynchronous readout of reader 20 is provided by leads 31–38 to the input of a buffer storage device 22.

A synchronous readout from buffer storage 22 is timed with $F_1$ pulses derived from a transmitter synchronous timing source 24. Hence, the synchronous readout from buffer storage 22 always provides a data block having a fixed time length that is 120 $F_1$ periods.

Although the synchronous data blocks always have the same time length, the transmitted spacer gap periods that follow them vary somewhat with variations in the reader rate.

Variations in block cycle time into and out of buffer 22 are shown in FIGURES 1(A) through (J). FIGURES 1(B), (E) and (H) illustrate synchronous block-cycle periods unloaded from buffer 22 adjacent to various nonsynchronous cycle periods loaded into buffer 22. The data is transmitted with synchronous timing as it is unloaded from buffer 22. FIGURE 1(A) shows a minimum loading cycle period, and FIGURE 1(D) illustrates a medium loading cycle period, wherein there is about a 10% difference between them. These medium and minimum limits are set to maintain the spacer gap of the communicated written data within the limits of 50% to 60% of the reader block length. It is presumed that computers using the communicated tape require a minimum gap of 50% but can use longer gaps.

The beginning of an unloading cycle is started with the beginning of a loading cycle from the reader.

A comparison of FIGURES 1(A) and 1(B) illustrate a minimum read time condition. It is determined by a minimum transmission gap which is equal to the minimum reader cycle time with an added stop gap minus the time for transmitting a synchronous block. The stop time is determined by the time between two word counts of the transmitted block, which are chosen to always occur in a reader spacer gap when a stop period is to be provided. In this embodiment the stop period is taken between the 65th and 72nd counts of a synchronously transmitted block.

FIGURE 1(A) illustrates a minimum block and spacer time. When a minimum block occurs, reader 20 is stopped during its following spacer gap for a fixed number of synchronous counts of the transmitted block. In this embodiment, the stop period is taken between counts (65) and (72) of a corresponding synchronous block in FIGURE 1(B) only when the reader block is completed before synchronous count (65).

At the receiver, a buffer device is provided that stores the synchronous block until half of it is received. It then starts unloading the data at twice the received rate to a data writer. Thus, a block is written in one-half the time it was received. It is followed by a spacer gap that is equal to the sum of the transmitted gap and one-half the transmitted block time. Thus, the written block cycle has a spacer gap that is slightly greater than 50% of the written block.

In fact, the reader can operate with a block time even smaller than the minimum defined above. However, the transmitted gap would become substantially less than a minimum value considered desirable in this embodiment; although it may be permissible in some instances.

The stop period is not provided during all gaps, but only during those following short reader block times, where the reader block time terminates before count (65) of the corresponding transmitted block. Thus, as the reader block times increases from its minimum value, it reaches a medium length where it terminates slightly after transmitter word count (65); and no stop period is induced for longer reader block times. The transmitted spacer gap will therefore not be lengthened by a stop period for the medium and larger sized block, as is seen in FIGURES 1(E) through (J).

The transmitter spacer increases to a maximum as the reader block lengthens to the medium length, as shown in FIGURES 1(G) and 1(H). When the reader block becomes slightly greater than the medium length in FIGURE 1(D), the transmitted spacer drops to a shorter value as shown in FIGURE 1(E).

A maximum reader block time for a 10% variation in reader rate is obtained when the reader block time increases beyond the medium value to provide another transmitted gap equal to the maximum gap obtained in FIGURE 1(H) with a reader block time slightly below the medium value. Such maximum is arbitrary and depends on the gap tolerances allowable for a given equipment. No absolute maximum is obtained until the reader block time becomes equal to the transmitted block time.

*Load pulser 41*

The system shown in FIGURE 2 uses the format explained in connection with FIGURES 1(A)–(J). Thus, in FIGURE 2, a load pulser 41 is provided which generates a pulse from each word of a block being read. Basically, the load pulser is an "OR" gate 42, which has eight inputs that respectively connect to the eight channel leads 31–38. Because of the lateral parity channel, it is assured that there will be at least one "1" bit during each word of a block. "OR" gate 42 passes the simultaneous "1" bits as a single output word pulse. Hence, one pulse is generated from each of the 120 word periods of a block.

Because there may be slight differences in alignment of simultaneous bits from reader 20, there may be variations in size of pulses provided from "OR" gate 42. Accordingly, a pulse shaper 43 is connected to its output to shape the pulses uniformly. Pulse shaper 43 may be a one-shot multivibrator having a pulse duration of about one-half an $F_1$ cycle.

*Buffer storage device 22*

Buffer 22 may be any type of random-access or sequential storage device having a capacity of at least one-half block, which in FIGURE 2 requires at least a sixty word capacity. It is presumed in this embodiment that storage device 22 is an X–Y magnetic core storage unit of the type known in the art.

Loading and unloading of buffer 22 are always done at different times to prevent interference between them. They are controlled by a pair of outputs from a high rate timing source 61. Source 61 provides interleaved output pulses P and $\overline{P}$ on leads 62 and 63. The pulses might have a rate greater than ten times the $F_1$ pulse rate. The output pulses have a short duty cycle; and pulses $\overline{P}$ occur mid-way between pulses P so that there can never be any time coincidence between them. Each loading operation is done at the time of a pulse P, and each unloading operation is done at the time of a pulse $\overline{P}$. Accordingly, they must occur at different times.

*Buffer load synchronizer 51*

Load synchronizer 51 chooses particular pulses P to control the loading operation. Load pulser 41 determines when pulses P should be selected. Each pulse from pulser 41 is provided on a lead 44 to load synchronizer 51. After each pulser pulse, synchronizer 51 provides one P pulse to the buffer on a lead 54 to control the loading of a word into the buffer.

Figure 4:
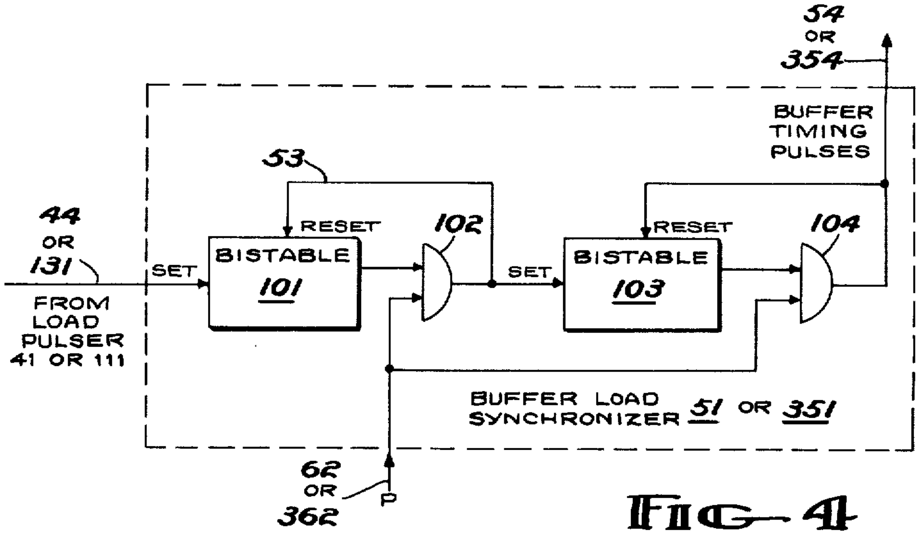
FIGURE 4 is a more detailed diagram of each buffer load synchronizer used in FIGURES 2 and 3.

FIGURE 4 illustrates a detailed form for synchronizer 51. It includes a first bistable circuit 101, which might be a flip-flop. It has a set input connected to lead 44 to receive the pulses from pulser 41. Each pulse sets bistable 101 so that an output enables an "and" gate 102. Another input of gate 102 is connected to lead 62 to receive the P pulses from source 61. Thus, as soon as gate 102 is enabled in response to a word being available from the reader, the very next P pulse passes through gate 102 to lead 53 and resets bistable 101. This disables gate 102 so that only one P pulse passes through it in response to one word being available from the reader.

Still further, the P pulse passed by gate 102 sets another bistable circuit 103, and its output enables another "and" gate 104. Lead 62 is also connected to an input of gate 104. Hence, when gate 104 is enabled, in response to the first P pulse, the very next P pulse passes through gate 104 to lead 54 and resets bistable 103 to disable gate 104 and prevent passage of any further P pulses. The pulse passed by gate 104 goes to buffer 22 to load the available word. The second P pulse is better formed than the first for actuating the buffer.

*Load counter 46*

Counter 46 may be a conventional type capable of counting from (0) to (120). Counter 46 is provided to time the operations of the system as they relate to the loading operation. The timing operations are indications of the beginning and ending of a block being read from reader 20 to control buffer loading operation, and to provide automatic resetting of other logic components in the system. Thus, counts (1) and (120) are provided on leads 47 and 48.

Counter 46 remains at count (120) until it is reset to (0) by a pulse indicating when a block has been unloaded from the buffer. The reset pulse is provided on lead 77 from an unload counter 76 which is described later.

*Transmit control bistable circuit 81*

As stated above, the buffer unload operation is started by the beginning of the buffer load operation. Thus, load count (1) is provided on lead 47 to set bistable circuit 81. Whenever circuit 81 is set from lead 47, it provides an output on a lead 82 to a buffer unload synchronizer 71, that signals synchronizer 71 that it should begin synchronously unloading data from buffer 22. A reset input of circuit 81 is signalled at the end of the block being synchronously unloaded by the last count (120) of unload counter 76, described later.

*Buffer unload synchronizer 71*

When synchronizer 71 receives an enabling signal from transmit control bistable 81, unload pulses are provided to the buffer on a lead 74 in synchronism with $F_1$ and $\overline{P}$ pulses. A first $\overline{P}$ pulse occurring after the start of each $F_1$ pulse is provided on lead 74 to insure proper passage of the next $\overline{P}$ pulse for buffer unloading. Hence, 120 consecutive $F_1$ pulses unload an entire block on leads 91–98 from buffer storage device 22.

Figure 5:
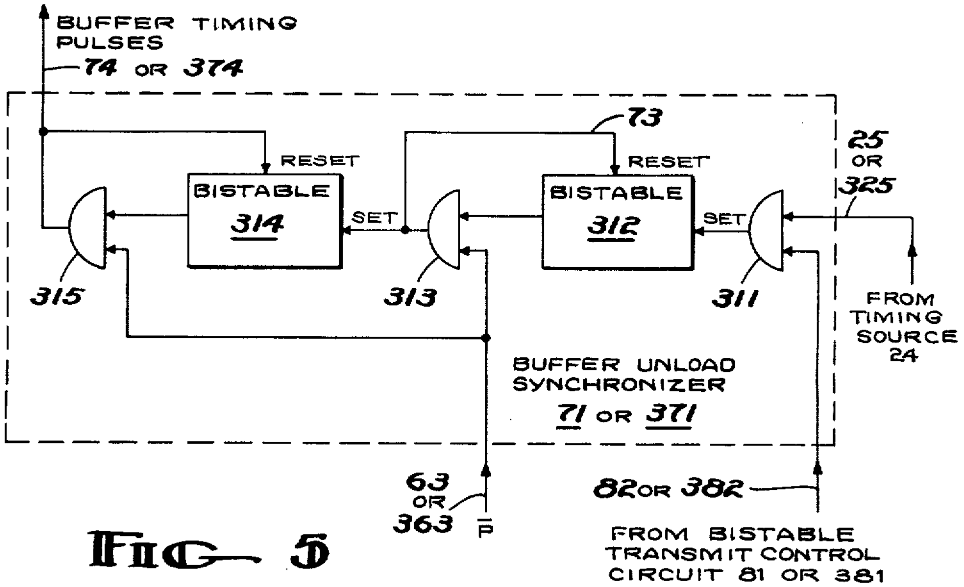
FIGURE 5 is a detail of each buffer unload synchronizer used in FIGURES 2 and 3.

FIGURE 5 illustrates a detailed form of unload synchronizer 71. It is very similar to load synchronizer 51, except that unload synchronizer 71 is responsive to the enablement and disablement of transmit control bistable circuit 81, which has its output provided on lead 82. A first "and" gate 311 in synchronizer 71 has an input connected to lead 82. Another input is connected to lead 25 to receive $F_1$ pulses from timing source 24. Accordingly, gate 311 can pass $F_1$ pulses only while control circuit 81 is enabled.

An $F_1$ pulse passing through gate 311 sets a bistable circuit 312. When set, its output enables an "and" gate 313, which receives $\overline{P}$ pulses from lead 63. The first $\overline{P}$ pulse occurring after gate 113 is enabled passes through it to a lead 73 to reset bistable circuit 312. Upon being reset, "and" gate 313 is disabled so that only one $\overline{P}$ pulse was passed.

Furthermore, the $\overline{P}$ pulse passed by gate 313 sets a bistable circuit 314. When set, it enables an "and" gate 315. Another input to gate 315 is connected to lead 63 to receive $\overline{P}$ pulses. The first $\overline{P}$ pulse occurring after enablement of gate 315 passes through it to lead 74 and resets bistable 314. Upon being reset, no further $\overline{P}$ pulse passes through gate 315. Accordingly, in response to each $F_1$ pulse occurring when circuit 81 is enabled, a $\overline{P}$ pulse is provided to lead 74 to unload a word.

*Synchronous transmitter 23*

Transmitter 23 may be any synchronous type for transmitting binary data. The type described in patent application No. 502,045 cited above is particularly well suited. Leads 91–98 provide inputs to synchronous transmitter 23. Transmitter 23 must have a data capacity determined by the maximum rate of operation of reader 20. Accordingly, it might have any number of channels, and a corresponding $F_1$ rate, with means for conveying the data to the required number channels. However, in this embodiment, it is presumed that transmitter 23 has eight channels, one for each lead 91–98.

Output 82 of transmit control bistable circuit 81 is connected to transmitter 23 so that it can be disabled during spacer gaps. Then the medium 99 can be used for other communications such as an answer back from the writing terminal to signal an error or other message.

*Unload pulser 86*

Pulser 86 has inputs connected to leads 91–98 to provide one pulse for each word unloaded from storage device 22. Pulser 86 is an "OR" gate of the same type as gate 42 in load pulser 41. However, a pulse shaper is not needed with unload pulser 86, because the coincidence of its inputs is assured by the unload operation of synchronizer 71.

*Unload counter 76*

Counter 76 may be conventional and of the same type as counter 46. It counts from (1) through (120). Counter 76 receives the output from unload pulser 86. It is reset to count (1) with count (1) from load counter 46 on lead 47.

A set of outputs are provided on leads 77, 78 and 79 from counter 76. Lead 78 indicates unload count 65 which may be used for starting a stop period for reader 20; and lead 79 provides count (72) which indicates the end of a stop period for the reader. Furthermore, lead 77 provides count (120) to a reset input of bistable circuit 81 to terminate the unload signal on its lead 82 to stop the unloading operation of synchronizer 71.

Figure 1:
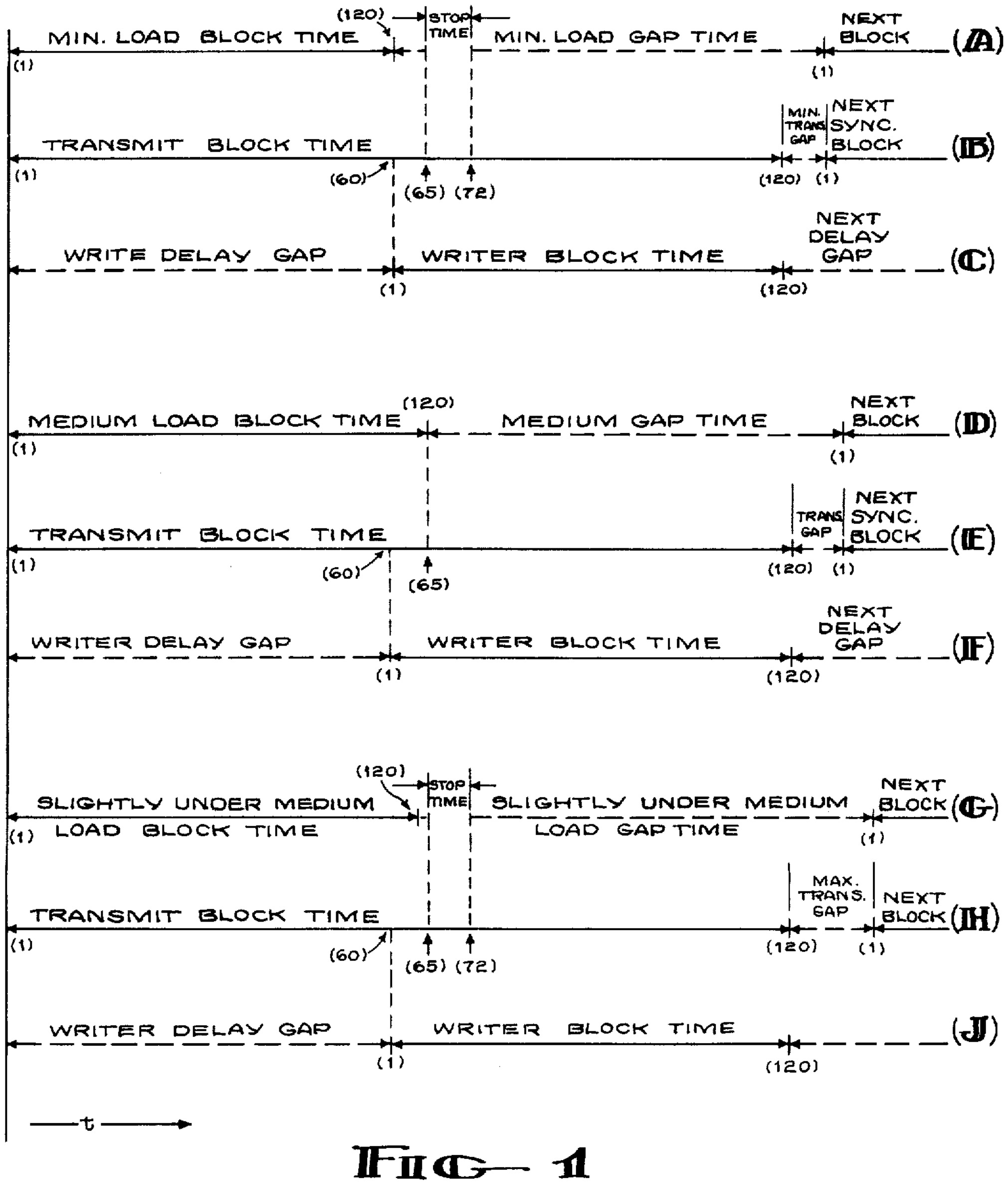

Also, unload count (120) always occurs in a reader spacer gap as can be seen in FIGURE 1. Thus, it is provided as a reset to load counter 46 to reset it to zero to await the next reader word. Hence, when unload count (120) is reached, no further words are provided in the block.

Thus, counter 76 remains at count (120) until a reset pulse is received from counter 46.

*Reader stop bistable circuit 83*

As explained in connection with FIGURES 1(A) and (G), a stop period may be provided during the spacer gaps of blocks shorter than the medium block time of FIGURE 1(D). Accordingly, stop periods are provided when reader 20 is operating near its fastest rate. Under such conditions, reader stop bistable circuit 83 is made to generate a stop signal for reader 20. A lead 89 provides the stop signal when circuit 83 is triggered at its set input. The stop signal ceases when a trigger pulse is provided at a reset input, which causes reader 20 to resume the forward tape direction.

An "and" gate 84 and a bistable circuit 50 determine when a reader block ends before unload count (65); and they therefore determine whether or not circuit 83 should provide a stop signal to the reader.

"And" gate 84 has an output 85 connected to the set input of bistable 83. Gate 84 has a pair of inputs connected to leads 49 and 78. Lead 49 provides the output of bistable 50. Whenever bistable 50 is reset, it provides a disabling input to gate 84. Lead 78 provides unload count (65) from counter 76.

Whenever a reader block is completed, load counter 46 provides an output count (120), which sets bistable 50 to provide an enabling input to gate 84. Accordingly, if unload count (65) occurs after load count (120), gate 84 will be enabled to pass unload count (65) to set bistable circuit 83. It therefore provides a stop output to reader 20 until reset. Circuit 83 is reset seven unload counts later when the unload count (72) is signalled on lead 79 to terminate the stop period and permit reader 20 to again continue in its forward reading direction. Hence, the stop signal exists in the spacer gap after a short reader block has been completed.

On the other hand, if the reader block does not end until after unload count (65) gate 84 is disabled when it receives count (65) which cannot pass. Furthermore, when gate 84 becomes enabled by load count (120), unload count (65) has already occurred. Hence, for reader blocks longer than the medium length block, no stop signal is triggered from bistable circuit 83.

WRITING TERMINAL

*Synchronous receiver 26*

Receiver 26 receives information being transmitted by transmitter 23 via either radio link, telephone wire, etc.

Receiver 26 may be any type capable of detecting the synchronous information being transmitted. A pilot tone, modulated at the $F_1$ rate may also be transmitted to establish synchronism between the receiver and transmitter. A receiver, as described in the above-cited patent application No. 502,045 now Pat. No. 2,905,812 is preferable. Outputs from receiver 26 are provided on leads 121 through 128, and they have the same form as provided from buffer 22 on leads 91–98.

A lateral parity checker may be included with receiver 26 to give an indication of a received error.

*Load pulser 111*

In order for the writing terminal to be aware of the reception of the respective word of a block, a receiver pulser 111 is provided which is constructed in the same manner as pulser 41 at the transmitter. Thus, pulser 111 includes an "OR" gate 112 having inputs connected to receiver output leads 121–128. A pulse shaper 113 is connected to the output of gate 112 to assure uniformity of the pulser output provided to a lead 131.

*Receiver word counter 114*

Receiver word counter 114 is connected to the pulser output to count the words in a block. Counter 114 may be conventional and capable of counting from (1) to (122).

*Receiver buffer storage device 300 and its control synchronization*

Storage device 300 may be of the same type as storage device 22 found at the reading terminal. Similarly, buffer 300 must have a storage capacity of at least ½ a block, which in this case is at least sixty words. A set of leads 121–128 connect the outputs of receiver 26 to the loading inputs of buffer 300.

Buffer 300 has its loading and unloading synchronized with respect to interleaved pulses P and $\overline{P}$ in the same manner as was done with buffer 22 at the reader. Accordingly, a high rate timing source 361 is provided which may be identical to source 61. Furthermore, a load synchronizer 351 and an unload synchronizer 371 are provided which may be identical to the load and unload synchronizers 51 and 71 at the reading terminal. Consequently, FIGURES 4 and 5 are just as applicable to synchronizers 351 and 371, respectively, with a corresponding change in reference numerals. Thus, 300 is added to each of the appropriate reference numerals in FIGURE 2 to make them correspond to the required numerals in FIGURE 3. Furthermore, lead 131 will replace input lead 44 in order to adapt it to FIGURE 3.

*Unload control bistable circuit 381*

Figure 3:
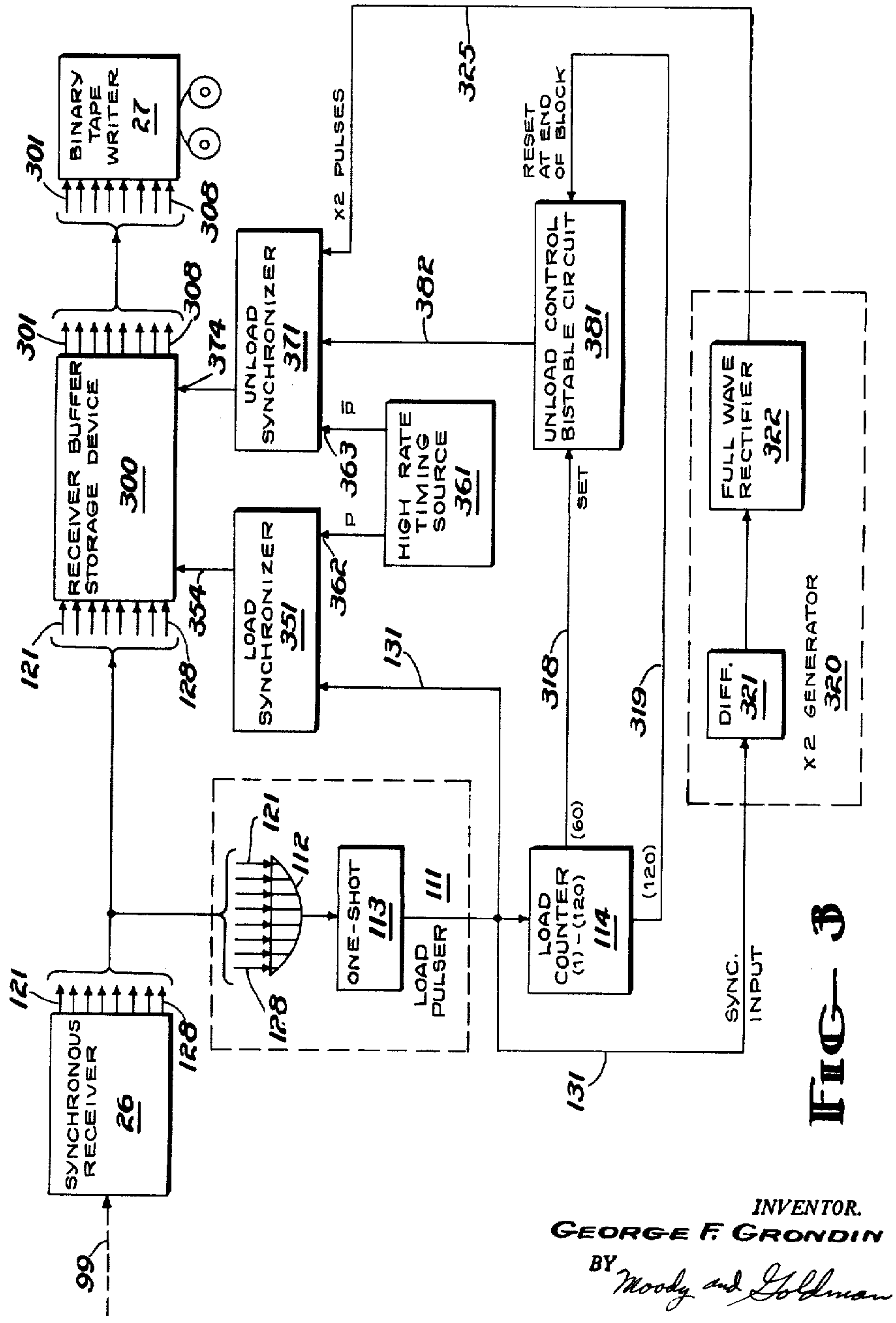
FIGURE 3 shows a writing terminal of an embodiment of the invention.

Bistable 381 has a set input connected to output lead 318 of load counter 114 in FIGURE 3, which provides load count (60) at the receiver. It will be noted in FIGURES 1(C), (F), and (J) that the writer block cycle does not begin until ½ of a transmitted block is received, which corresponds to transmitted block count (60). Hence, on received count (60), an output 382 is provided from bistable 381, which signals synchronizer 371 that it should start unloading a block of data from buffer 300. However, the rate at which the buffer is unloaded is controlled by the rate at which a set of pulses are provided on a lead 325. Bistable 381 is reset at the end of a block by the last word count (120), which is provided from load counter 114 on a lead 319.

*X2 Generator 320*

Generator 320 provides a set of pulses which control the rate of unloading of buffer 300. An input to generator 320 is provided by the output of load pulser 111 on lead 131. Generator 320 generates two pulses for each one that it receives.

Generator 320 is comprises of a differentiator 321, and a full wave rectifier 322. The differentiator receives the output pulses from load pulser 111, which are shaped by one-shot 113, that has a pulse duration of ½ an $F_1$ period. Thus, differentiator 321 senses the leading and trailing edges of each word pulse from pulser 111 and generates corresponding opposite polarity pulses at its output. A full-wave rectifier 322 receives the output of differentiator 321 and changes all of its pulses to the same polarity. Hence, rectifier 322 does not have any output filter, and its output pulses will have twice the rate of the word pulses. Although the output of generator 320 begins providing X2 pulses as soon as a word is received, its pulses on lead 325 are of no effect on unload synchronizer 371, because it does not receive any enablement from bistable 381 until count (60) is reached. Synchronizer 371 is then enabled for the last half of the received block by unload control bistable circuit 381. The last sixty word pulses of a received block generate 120 pulses from generator 320 to unload the 120 words of the block during the last ½ of the received block period.

*Digital tape writer 27*

A digital tape writer 27 has eight channels connected to unload outputs of buffer 300 on leads 301–308 and writes the information at twice the synchronous received rate. Writer 27 is a standard digital tape handler, such as Ampex FR-200 or Potter 906 set for writing operations.

Since the blocks are unloaded from buffer 300 at twice the synchronously received rate, they will be written in ½ the time of the transmitted block. The remaining portions on the written tape are spacer gaps, which exist between written blocks. Hence, the spacer gap beginning at the end of a written block lasts until count (60) of the next following received block, which starts the writing of the next block.

Since the format of operation, as explained in connection with FIGURES 1(A)–(J), assures that there will be a following spacer gap of the order of at least a few percent of each transmitted block, there is sufficient time to permit error signaling and reversing operations of the reader and writer with respect to an erroneously received block without interfering with adjacent correctly transmitted blocks. To do this, the error correcting system and circuitry shown and taught in patent application Serial No. 842,709, now Patent No. 3,131,377 cited above is directly applicable.

The herein described embodiment of the invention specifies a 50%–50% format with an X2 pulser at the receiving terminal that synchronizes the X2 pulses with the received words. This synchronism is not mandatory since buffer 300 is of the random-access or sequential type. Thus X2 generator 320 could instead operate from an independent source of pulses that have a rate that is only approximately two times the $F_1$ timing rate.

This specification describes a preferred mode of the invention which uses a 50%–50% tape format. However, it will be apparent to those in the art after studying this specification that the present invention is applicable to any format where any ratio ($B/C$) may exist for a block time (B) of a block and gap tape cycle period (C). Neither B nor C need be an integer number. Thus, generator 320 will provide an output pulse rate of approximately ($C/B$) multiplied by the synchronous bit rate. The start of unloading of each block from buffer 300 will be delayed by approximately ($1-B/C$) of a received cycle period; and this can be done by choosing an appropriate output count from load counter 114.

For example, a tape format cycle having a (3/10) block time ratio should have generator 320 operate at a rate of X3.33 the synchronous received rate; and the unloading state of buffer 300 should be delayed by (7/10) of a cycle. Thus for a 120 bit block, the unloading can be started by count (84) of counter 114.

Where an extra channel is available on the tape, it may be used for error answer-back. In such case, the answer-back need not await the spacer gap following an erroneous block, but reverse block counting must assure that the reversing process stops in a spacer gap.

The principles of the invention have been described and illustrated in an operative system for the purpose of teaching those skilled in the art how the invention may be performed. Changes in the components, units and assemblies will appeal to those skilled in the art, and it is contemplated that such changes may be employed, but yet fall within the spirit and scope of the claims that are to follow.

I claim:

1. A system for bit-synchronously transmitting digital data recorded on tape in blocks separated by large spacer gaps, comprising a nonsynchronous data reader for reading said tape, a synchronous transmitter, a buffer storage device connected between said reader and said transmitter to store nonsynchronously read data, a synchronous timing source connected to said transmitter and to said buffer storage device to synchronously unload it into said transmitter, means for beginning the unloading of said buffer at the beginning of a block being read, timing means triggered by the output of said reader to provide first and second timed points, said first timed point being positioned in time from the beginning of said block by an amount equal to a medium block time, said second time points being time spaced later than said first point, means for measuring the time lengths of blocks being read with respect to said medium block time, said measuring means providing a signal output for each load block having a shorter time length than said medium block time, reader stop means responsive to said signal output of said measuring means to stop the reading operation of said reader at said first timed point, and said reader stop means being responsive to the second timed point to start said reader in its normal reading operation.

2. A system for receiving digital information being transmitted with a relatively small gap and writing it with an approximate block-to-block cycle ratio ($B/C$) in which the block time is (B) and the block and gap tape cycle period is (C), comprising a synchronous receiver, a tape writer, a buffer storage device connected between said receiver and said writer for transferring data from said receiver, a local pulser timing source having a pulse rate of approximately ($C/B$) multiplied by the synchronous transmission rate, and means for delaying the unloading of each received block from said buffer by approximately ($1-B/C$) of a received cycle period.

3. A system for bit-synchronously transmitting digital data recorded on tape, said data being recorded in blocks of words separated by large spacer gaps, comprising a nonsynchronous data reader for reading said tape, a synchronous transmitter, a buffer storage device connected between said reader and said transmitter to store said nonsynchronously read data, a synchronous timing source connected to said transmitter and said buffer storage device to synchronously unload it into said transmitter, a load pulser connected to the output of said reader to generate one pulse per word, a load counter connected to said load pulser, an unload pulser connected to an output of said buffer storage device, an unload counter connected to said unload pulser, a first output of said load counter providing a pulse at a beginning of a block being read, a second output of said unload counter providing a pulse at an ending of a block being read, said unload counter providing first and second outputs at two counts intermediate a block being synchronously unloaded, control means for beginning the unloading operation of said buffer storage device in response to the first output of said load counter, a bistable circuit having a set input connected to the second output of said load counter, an "and" gate being connected to an output of said bistable circuit and being inhibited when said bistable circuit is set, another input of said "and" gate being connected to the first input of said unload counter, a stop control bistable circuit connected to said binary reader to stop it when set, an output of said "and" circuit connected to a set input of said stop control bistable circuit to set it in response to an uninhibited first output of said unload counter to stop the reading operation, a reset input of said stop control bistable circuit being connected to the second output of said unload counter to continue the reading operation.

4. A transmitting system as defined in claim 3, in which said unload counter provides a third output at the end of each block being unloaded, a control bistable circuit having a set input connected to the first output of said load counter and having a reset input connected to the third output of said unload counter, means for synchronously unloading said buffer storage device in response to the output of said control bistable circuit.

5. A system, as in claim 4, in which counts 65 and 72 of said unload counter provide its first and second outputs respectively.

6. A system for receiving digital information being transmitted in blocks of words with a relatively small gap and writing it with approximately equal length blocks and gaps, comprising a receiver, a tape writer, a buffer storage device connected between the said receiver and said writer for storing data from said receiver, a local timing generator having a rate approximately equal to twice the received timing rate, a load pulser connected to an output of said receiver to provide a pulse from every received word in a block, a load counter connected to said pulser, said load counter providing a first output at a count occurring in the approximate middle of each block, and means for triggering the start of an unloading operating in response to said load counter first output.

7. A receiving system, as defined in claim 6, in which said load counter provides a second output at the end of each received block, means for synchronizing the output of said pulse generator with the output of said pulser, an unload control bistable circuit having a set input connected to the first output of said load counter and having a reset input connected to the second output of said load counter, and means connecting the output of said unload control bistable circuit to said storage device to unload it to said writer between the set and reset operations of said unload control bistable circuit.

References Cited by the Examiner

UNITED STATES PATENTS

| | | | |
|---|---|---|---|
| 2,782,398 | 2/57 | West | 340—174 |
| 2,907,002 | 9/59 | Smith | 340—172.5 |
| 2,907,010 | 9/59 | Spielberg | 340—174 |
| 2,921,296 | 1/60 | Floros | 340—174 |
| 2,961,643 | 11/60 | Ayers et al. | 340—172.5 |
| 3,010,095 | 11/61 | Dirks | 340—172.5 |
| 3,015,089 | 12/61 | Armstrong | 340—172.5 |
| 3,063,015 | 11/62 | Moore et al. | 340—172.5 X |

MALCOLM A. MORRISON, *Primary Examiner.*

EVERETT R. REYNOLDS, IRVING L. SRAGOW, *Examiners.*